Sept. 14, 1948.　　　R. BERNHARD　　　2,449,198
RIDING RING MOUNTING FOR ROTARY CYLINDERS
Filed Aug. 28, 1946
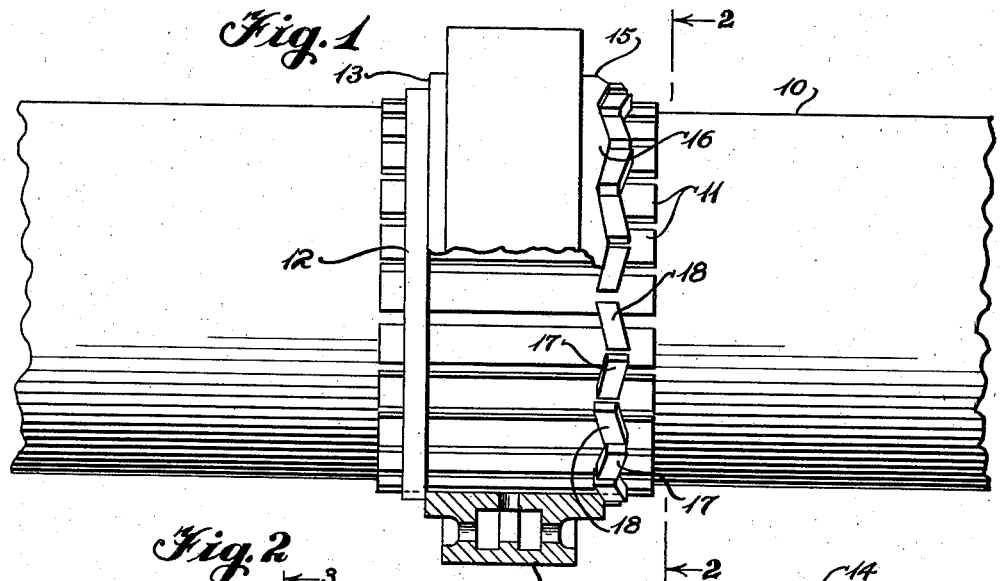
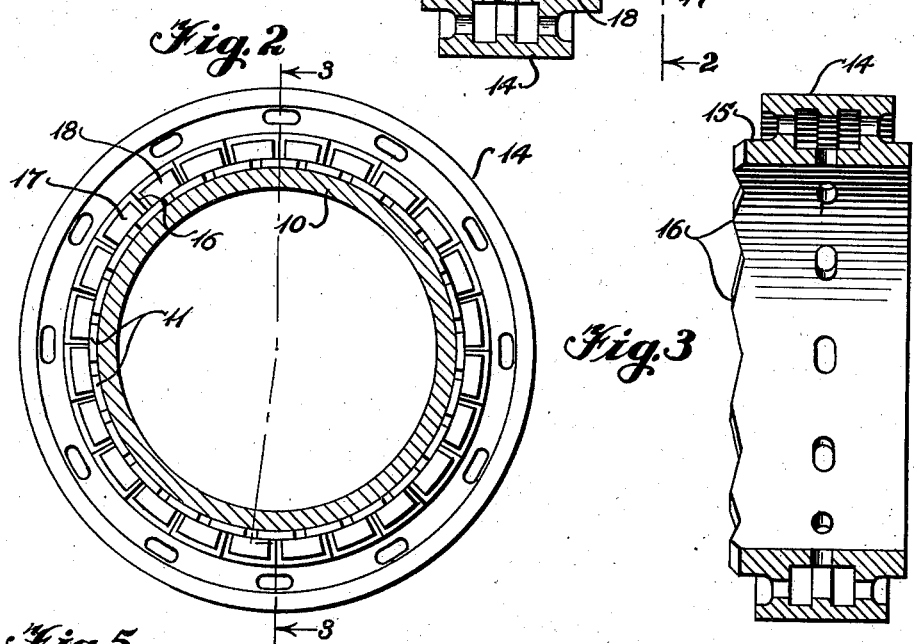
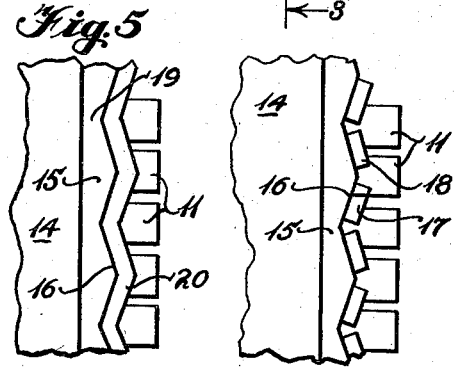
Inventor
Richard Bernhard
Attorneys Patented Sept. 14, 1948

2,449,198

UNITED STATES PATENT OFFICE 2,449,198

RIDING RING MOUNTING FOR ROTARY CYLINDERS

Richard Bernhard, Allentown, Pa., assignor to Traylor Engineering & Manufacturing Company, Allentown, Pa., a corporation of Delaware Application August 28, 1946, Serial No. 693,599

12 Claims. (Cl. 308—204)

In the operation of rotary cylinders, such as the shells of rotary kilns, much difficulty has been encountered due to the failure of the securing means by means of which the riding rings are secured to the cylinder. Due to the differential expansion of the cylinder and rings, the heads of securing means such as bolts or rivets come to be stripped off, with subsequent shearing of the stem portions. Relative rotation of the rings and cylinder then occurs with destructive wear on the cylinder and the cylinder becomes displaced axially, rendering costly repairs and readjustments necessary. The object of the present invention is to eliminate these difficulties by providing a self-locking arrangement between the cylinder and rings, preferably with wear and ventilating means between the two, and without the necessity of drilling the cylinder, with weakening effect, for bolts or rivets. The invention is shown in illustrative embodiment in the accompanying drawing in which:

Figure 1 is a partial view of a rotary cylinder with associated riding ring.

Figure 2 is a section on line 2—2 of Figure 1.

Figure 3 is a section on line 3—3 of Figure 2.

Figure 4 is a developed view of a portion of Figure 1, and

Figure 5 is a view like that of Figure 4 showing a modification.

Referring to Figures 1 to 4, reference numeral 10 designates a cylinder rotatable on a generally horizontal axis, the cylinder being, for example, the shell of a calcining kiln. Such cylinders are supported for rotation on a plurality of riding rings but for the purposes of the present disclosure the showing of only one together with its mounting means will suffice, it being understood that this structure can be repeated at such points along the kiln as may be necessary.

Reference numeral 11 designates axially extending shim bars which are welded in circumferential series to the exterior of the cylinder in somewhat spaced apart relation, the shim bars being transversely curved so as to conform to the curvature of the cylinder. Welded to the tops of the shim bars adjacent one end thereof is an abutment ring 12 for a side flange 13 of a riding ring 14, which, in assembly, is moved in surrounding relation along the cylinder from the right, as in Figure 1, and over the shim bars into abutment with ring 12. At its other side, ring 14 has a flange 15 provided with a continuous circumferential series of axially faced and symmetrically disposed substantially triangular teeth 16, the triangular form of the teeth as here shown being relatively flat isosceles.

Welded to the ends of the shim bars which project beyond the teeth 16 is a circumferential series of wedge formations in the form of blocks 17 and 18 of which adjacent ones are in angular relation so as to form between them an angle complementary to the angle of the teeth 16 and respectively engaging the sides thereof. The blocks are curved to follow the outside curvature of the shims and bridge the spaces between the shims, as here shown. The blocks 17 and 18 constitute side abutment means for the riding ring and furthermore, upon any relative turning between the cylinder and riding ring immediately act to wedge the ring against the abutment 12 so that relative turning is positively limited. The shim bars not only serve as wear means to relieve the cylinder of wear, but the spaces between them provide for the cooling of the riding ring so that expansion and contraction of the latter is minimized. The inside of the riding ring is sufficiently larger than the outside circle of the shim bars so as to permit free expansion of the cylinder 10.

By providing the two abutment blocks 17 and 18 for each tooth, the self-locking action is effective in either direction of relative rotation. It will be understood that one or the other of blocks 17 and 18 could be omitted if it were merely necessary to limit relative turning in a single direction.

In Figure 5 the flange 15 is the same as before as are also the shim blocks 11. However, in this case, instead of using the individual blocks 17 and 18, a continuous ring 19 is welded to the shim blocks, ring 19 having teeth 20 complementary to the teeth 16 and interengaged therewith, the ultimate effect being the same as in the first form.

Other variations in the form and arrangement of parts are possible and are contemplated under the invention as defined in the following claims.

I claim:

1. In combination, a rotary cylinder and a riding ring surrounding said cylinder, abutment means for one side of the ring fixed to the cylinder, the other side of the ring being provided with a circumferentially extending series of substantially triangular teeth, and abutment means for said other side of the ring fixed to said cylinder and presenting a series of wedge formations engageable with one side of the ring teeth upon relative turning of the cylinder and ring in one direction whereby to wedge the ring against the first abutment means and to positively limit such relative turning.

2. In combination, a rotary cylinder and a riding ring surrounding said cylinder, abutment means for one side of the ring fixed to the cylinder, the other side of the ring being provided with a circumferentially extending series of substantially triangular teeth, and abutment means for said other side of the ring fixed to said cylinder and presenting a series of wedge formations engageable with one side of the ring teeth upon relative turning of the cylinder and ring in one direction whereby to wedge the ring against the first abutment means and to positively limit such relative turning, the second abutment means being in the form of a continuous ring.

3. In combination, a rotary cylinder and a riding ring surrounding said cylinder, abutment means for one side of the ring fixed to the cylinder, the other side of the ring being provided with a circumferentially extending series of substantially triangular teeth, an abutment means for said other side of the ring fixed to said cylinder and presenting a series of wedge formations engageable with one side of the ring teeth upon relative tuning of the cylinder and ring in one direction whereby to wedge the ring against the first abutment means and to positively limit such relative turning, the second abutment means being in the form of individual blocks.

4. In combination, a rotary cylinder and a riding ring surrounding said cylinder, abutment means for one side of the ring fixed to the cylinder, the other side of the ring being provided with a circumferentially extending series of symmetrically disposed substantially triangular teeth, and abutment means for said other side of the ring fixed to the cylinder and presenting a series of teeth substantially complementary to the ring teeth and engaged therewith and acting upon relative turning of the cylinder and ring in either direction to wedge said ring against the first abutment means and to positively limit such relative turning.

5. In combination, a rotary cylinder and a riding ring surrounding said cylinder, abutment means for one side of the ring fixed to the cylinder, the other side of the ring being provided with a circumferentially extending series of symmetrically disposed substantially triangular teeth, and abutment means for said other side of the ring fixed to the cylinder and presenting a series of teeth substantially complementary to the ring teeth and engaged therewith and acting upon relative turning of the cylinder and ring in either direction to wedge said ring against the first abutment means and to positively limit such relative turning, the second abutment means being in the form of a continuous ring.

6. In combination, a rotary cylinder and a riding ring surrounding said cylinder, abutment means for one side of the ring fixed to the cylinder, the other side of the ring being provided with a circumferentially extending series of symmetrically disposed substantially triangular teeth, and abutment means for said other side of the ring fixed to the cylinder and presenting a series of teeth substantially complementary to the ring teeth and engaged therewith and acting upon relative turning of the cylinder and ring in either direction to wedge said ring against the first abutment means and to positively limit such relative turning, the second abutment means being in the form of individual blocks.

7. In combination, a rotary cylinder, a series of axially extending shim blocks welded to the cylinder around the exterior thereof in spaced apart relation, a riding ring surrounding said series of blocks, abutment means for one side of the ring fixed to said blocks, the other side of the ring being provided with a circumferentially extending series of substantially triangular teeth, and abutment means for the other side of said ring fixed to said blocks and presenting a series of wedge formations engageable with one side of the ring teeth upon relative turning of the cylinder and ring in one direction whereby to wedge the ring against the first abutment means and to positively limit such relative turning.

8. In combination, a rotary cylinder, a series of axially extending shim blocks welded to the cylinder around the exterior thereof in spaced apart relation, a riding ring surrounding said series of blocks, abutment means for one side of the ring fixed to said blocks, the other side of the ring being provided with a circumferentially extending series of substantially triangular teeth, and abutment means for the other side of said ring fixed to said blocks and presenting a series of wedge formations engageable with one side of the ring teeth upon relative turning of the cylinder and ring in one direction whereby to wedge the ring against the first abutment means and to positively limit such relative turning, the second abutment means being in the form of a continuous ring.

9. In combination, a rotary cylinder, a series of axially extending shim blocks welded to the cylinder around the exterior thereof in spaced apart relation, a riding ring surrounding said series of blocks, abutment means for one side of the ring fixed to said blocks, the other side of the ring being provided with a circumferentially extending series of substantially triangular teeth, and abutment means for the other side of said ring fixed to said blocks and presenting a series of wedge formations engageable with one side of the ring teeth upon relative turning of the cylinder and ring in one direction whereby to wedge the ring against the first abutment means and to positively limit such relative turning, the second abutment means being in the form of individual blocks.

10. In combination, a rotary cylinder, a series of axially extending shim blocks welded to the cylinder around the exterior thereof in spaced apart relation, a riding ring surrounding said series of blocks, abutment means for one side of the ring fixed to said blocks, the other side of the ring being provided with a circumferentially extending series of symmetrically disposed substantially triangular teeth, and abutment means for the other side of said ring fixed to said blocks and presenting a series of teeth substantially complementary to the ring teeth and engaged therewith and acting upon relative turning of the cylinder and ring in either direction to wedge said ring against the first abutment means and to positively limit such relative turning.

11. In combination, a rotary cylinder, a series of axially extending shim blocks welded to the cylinder around the exterior thereof in spaced apart relation, a riding ring surrounding said series of blocks, abutment means for one side of the ring fixed to said blocks, the other side of the ring being provided with a circumferentially extending series of symmetrically disposed substantially triangular teeth, and abutment means for the other side of said ring fixed to said blocks and presenting a series of teeth substantially complementary to the ring teeth and engaged therewith and acting upon relative turning of the cylinder and ring in either direction to wedge said ring against the first abutment means and to positively limit such relative turning, the second abutment means being in the form of a continuous ring.

12. In combination, a rotary cylinder, a series of axially extending shim blocks welded to the cylinder around the exterior thereof in spaced apart relation, a riding ring surrounding said series of blocks, abutment means for one side of the ring fixed to said blocks, the other side of the ring being provided with a circumferentially extending series of symmetrically disposed substantially triangular teeth, and abutment means for the other side of said ring fixed to said blocks and presenting a series of teeth substantially complementary to the ring teeth and engaged therewith and acting upon relative turning of the cylinder and ring in either direction to wedge said ring against the first abutment means and to positively limit such relative turning, the second abutment means being in the form of individual blocks.

RICHARD BERNHARD.

REFERENCES CITED

The following references are of record in the file of this patent:

UNITED STATES PATENTS

| Number | Name | Date |
|---|---|---|
| 1,864,716 | Doremus | June 28, 1932 |
| 2,119,413 | Batchelder | May 31, 1938 |